United States Patent [19]

Goldsmith et al.

[11] 4,389,785
[45] Jun. 28, 1983

[54] SINE-BAR GAGE-BLOCKS AND DIRECT READING MICROMETER ADJUSTMENT

[76] Inventors: Wesely R. Goldsmith, 3383 Moore St., Mar Vista, Calif. 90066; Joel E. Di Marco, 4288 Revere Pl., Culver City, Calif. 90230

[21] Appl. No.: 216,657

[22] Filed: Dec. 15, 1980

[51] Int. Cl.³ .......................... G01B 3/18; G01B 3/30
[52] U.S. Cl. ..................................... 33/174 S; 33/166
[58] Field of Search ................. 33/174 S, 174 H, 166

[56] References Cited

U.S. PATENT DOCUMENTS

| | | | |
|---|---|---|---|
| 2,446,562 | 8/1948 | Trbojevich | 33/174 S |
| 2,505,928 | 5/1950 | Worby | 33/174 S |
| 3,423,885 | 1/1969 | Crandall | 33/174 S |
| 3,788,633 | 1/1974 | Cho | 33/174 S |
| 3,820,247 | 6/1974 | Casen et al. | 33/174 S |
| 4,238,888 | 12/1980 | Goldsmith | 33/174 S |

OTHER PUBLICATIONS

"A Combination Sine Plate", *American Machinist*, vol. 76, p. 795, Jun. 23, 1932.

*Primary Examiner*—Willis Little
*Attorney, Agent, or Firm*—William H. Maxwell

[57] ABSTRACT

A set of selectively useable primary gage-blocks displacing plugs of a first sine-bar at increasing degree ranges of angularity, and selectively useable secondary gage-blocks for disposition between a primary block and displaced sine-bar plug for the increase in angularity to degree increments within said primary block range, and combined therewith a second sine-bar and directly reading micrometer adjustment for angular displacement of the secondary sine-bar in degrees and minutes of angularity, the micrometer being comprised of a barrel having a curvilinear index line with axial calibration in degrees and displaced from rotation of an extension screw of uniform pitch, and a thimble with circumferential calibrations in minutes and rotating with the said extension screw to be revolved in reference to said curvilinear index line and thereby extended in decreasing amounts corresponding to the height dimensions required in order to establish sine-bar angularity.

13 Claims, 5 Drawing Figures

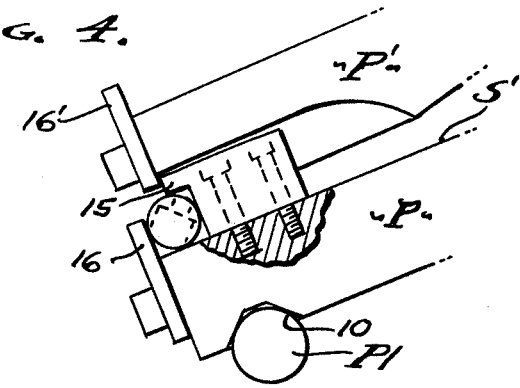

SINE-BAR GAGE-BLOCKS AND DIRECT READING MICROMETER ADJUSTMENT

BACKGROUND

The sine-bar is used for angular measurements or for location of work at given angles, as for example in measuring or checking angles with accuracy using precision gage-blocks selected for whatever dimension is required in obtaining a given angle. Precision gage-blocks are usually purchased in sets comprising a specific number of blocks of different sizes determined mathamatically so that particular heights can be obtained by combining select blocks, two or more blocks being combined by "wringing" them together with a swivelling motion causing them to adhere accurately one to another. When combining blocks for a given dimension, the object is to use as few blocks as possible, the procedure being based upon successive elimination of the right hand digit of the desired dimension. For example, the combined blocks measuring $0.1002 + 0.124 + 0.450 + 3.00$ equals 3.6742 inches. An accurate surface plate or master flat is always used in conjunction with a sine-bar in order to form the base from which the vertical measurements are made, heretofore with precision gage-blocks in English or Metric increments of measurement. A standard length for sine-bars is five inches (also ten inches) and there are tabulated constants that represent vertical heights H for setting a five inch sine-bar (also for ten inch bars) to the required angle. Assuming that the required angle is 31° 20', the sine tables show that the height H should equal 2.6001 inches. Note that the constants in the sine tables equal five times the sine of angle: thus the sine of 31° 20' in the trigonometric function table is 0.52002, and $0.52002 \times 5$ equals 2.6001 inches. There are many such functions for the use of a sine-bar, such as finding and checking angles, measuring angles and tapers and to determine center distances etc. However, note the complexity and precision of the involved process of using combinations of gage-blocks according to the tabulated contents of the sine tables, in order to arrive at a precise angle; it being a general object of this invention to facilitate sine-bar operation with the application of direct displacement gage-blocks and supplemented by direct readings on the barrel of a micrometer that adjusts the height H with minutes of precision.

Precision gage-blocks are purchased in sets comprising a specific number of blocks of different sizes (heights). The nominal gage sizes of individual blocks in a set are determined mathamatically so that particular desired sizes (heights) can be obtained by combining selected blocks. When there is in a set no single block of exact size that is wanted, two or more blocks are combined by "wringing" them together, achieved by crosswise placement and swivaling them together with face to face pressure, causing them to adhere by virtue of their precision surface to surface engagement. It is an object of this invention to minimize the tedious reference to trig tables and the selection of blocks which requires a high degree of intelligence and considerable training, and yet always subject to inadvertance, accident, mistake and resultant discrepancies. With the present invention, no more than one or two blocks are ever employed, and fine adjustment in minutes is a direct angular reading.

Sine-bars are precision devices for measuring angles accurately and to locate work at a desired angle to some true surface, preferably a surface plate or the like. Sine-bars consist of a hardened ground and laped steel bar which has accurately spaced cylindrical plugs of equal diameter attached to or near each end. The sine-bar has notched ends receiving the cylindrical plugs which are held firmly against angular faces of the notch, for example exactly five inches or ten inches apart. The upper and lower sides of the sine-bars are parallel to the axes of the two plugs within very close limits. The exact degree of angularity which a five inch or ten inch bar makes with a plane surface is obtained by determining the precise difference in vertical height of the spaced plugs. There are various forms of sine-bars and a refinement and/or carrying forward of the sine-bar concept involves simple and compound sine plates characterized by a precision plate pivoted by a plug at one end to a base and adapted to be elevated by the plug at the other end. In compound sine plates, the work supporting sine plate employs the underlying sine plate as its base. In any event, gage-blocks have been used for elevating these sine plates respectively, and it is an object of the present invention to supplement direct displacement gage-blocks with a direct reading micrometer combined therewith for elevation of an upper part positioning plane to be disposed as to height H' from the plane of a primary sine-bar, all as hereinafter described.

Mircometers take various forms, comprised generally of two visible elements and namely a barrel and a thimble, the barrel operating on a screw having forty threads per inch so that one revolution moves the barrel and thimble one fortieth of an inch. A feature is the relationship of calibrations on one element relative to an index line on the other element. In normal practice, the barrel is provided with a straight axially disposed index line stepped off incrementally in calibrations spaced 0.025 inch, and the thimble with an edge overlying said index line and calibrated circumferentially into twenty-five equal parts. Thus, each line on the thimble represents one thousandths of an inch, while each calibration line on the barrel represents twenty-five thousandths of an inch. It is an object of this invention to provide an inside micrometer that reads in plus or minus degree of angle on the barrel as related to a sine-bar of which it is made a part, and wherein minutes of angle are available as scaled readings on the thimble. With the present invention, a vernier scale can be employed in addition to the regular scales as disclosed and claimed in my U.S. Pat. No. 4,238,888 issued Dec. 16, 1980, so that settings in degrees, minutes and seconds are made possible. In practice, sufficient accuracy is obtainable in most instances by interpolating between minute markings.

DRAWINGS

The various objects and features of this invention will be fully understood from the following detailed description of the typical preferred form and application thereof, throughout which description reference is made to the accompanying drawings, in which:

FIG. 4 is an enlarged detailed view of the coupled engagement that secures the secondary sine-bar to the primary sine-bar.

And, FIG. 5 is a layout view of the set of angular displacement gage-blocks, comprising primary master blocks in a multiplicity of angular displacement ranges, and secondary degree blocks identified for selective use with the primary master blocks respectively.

PREFERRED EMBODIMENT

Gage-blocks and micrometers are direct reading devices for measuring distance, and it is an inside measurement of height H between the flat surface S and a sine-bar plug P2 with which this invention is concerned. As shown, there is a primary sine-bar P five inches in length and notched at 10 and 11 where spaced transverse and parallel plugs P1 and P2 are attached. A true surface S is provided as the flat reference plane from which the sine-bar P or sine plate, simple or compound, is to be angularly elevated according to accepted practice and standards with the vertical height offset H as specified.

This invention involves a secondary sine-bar P' as shown five inches in length, notched at 10' where a transverse plugs P1' is attached. An angularly disposed surface S' is provided on the primary sine-bar P as the flat reference plane from which the sine-bar P' or sine plate, simple or compound, is to be angularly elevated according to accepted practice and standards with the vertical height offset H' as specified in addition to the primary or master offset H. As shown herein, the sine-bars P and P' are simple in that they adjust to a single angular displacement. The surface S' of primary sine-bar P is also a work positioning surface, and the secondary sine-bar P' has a work supporting surface S". It is to be understood that either surface S' or S" can be utilized to support the work to be positioned thereby, or simply to establish angles as may be required.

Figure 1:
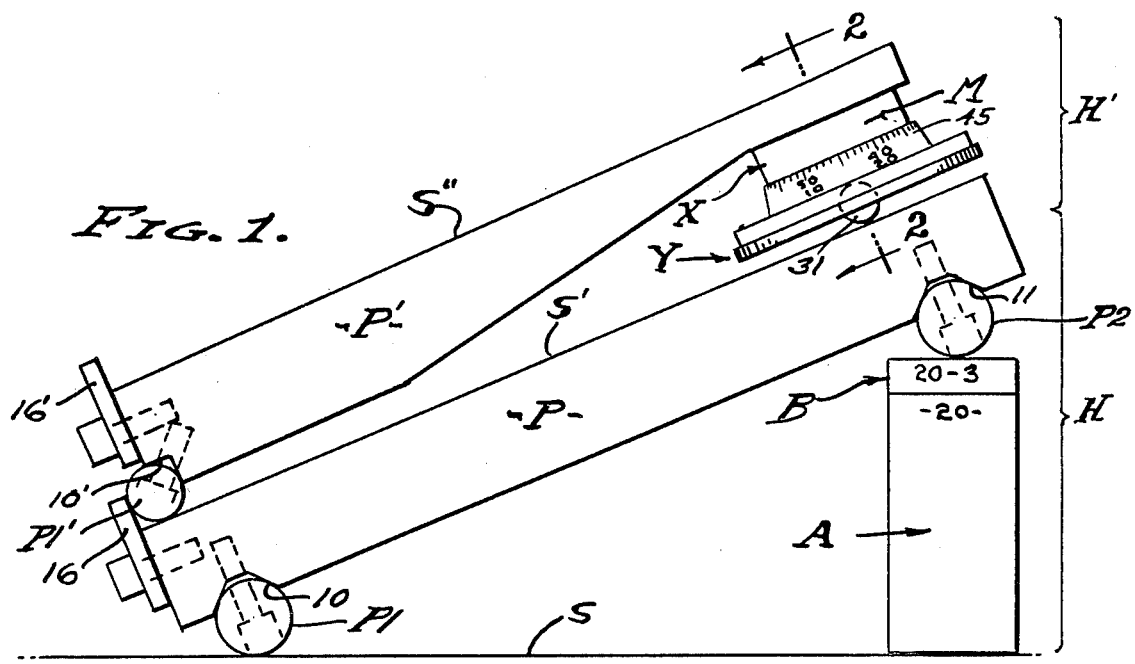
FIG. 1 is a side view of the direct angular displacement gage-blocks and placement of the primary sine-bar combined with the secondary sine-bar and direct reading micrometer adjustment for minute accuracy.
Figure 2:
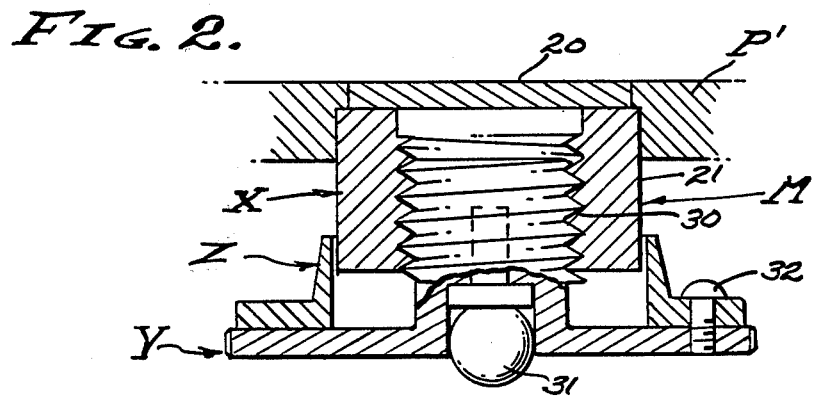
FIG. 2 is an enlarged detailed sectional view taken as indicated by line 2—2 on FIG. 1.

According to the above, the use of sine-bar P' is selective dependent upon whether minutes of adjustment are required or not. Therefore, the sine-bar P' can be removable from sine-bar P, or it can remain in position and the micrometer means M hereinafter described set at —O— degree (no minute variation). As shown, a hooked plate 15 of sine-bar P as shown in FIG. 1 as extended over the top center portion of plug P1' in order to capture the plug of sine-bar P' against the foot plate of sine-bar P. The detachable version is shown in FIG. 1, the coupled version being shown in FIG. 4. The foot plates 16 and 16' are flat to form recesses to serve as a corner for location of the sine-bar P' or a work piece as may be required.

In accordance with this invention, direct displacement gage-blocks are provided for angular positioning of the sine-bar P by elevating the plug P2 from the base plane or flat S. A feature is the avoidance of one block for every degree of angle, which is the state of the art and which results in great weight in a set of posts that are of full height and range. Characteristically therefore, this invention involves primary and secondary gage-blocks A and B, the primary gage-blocks A being master blocks each selectively applied so as to establish a range of angular increments, and the secondary blocks B being degree blocks each to establish a determined degree of angle greater than the primary gage-block A to which it is selectively applied. It will be seen that the number of full height gage-blocks is reduced and minimized, and that the great majority of angular positions are replaced by relatively smaller gage-blocks.

In practice, 45° of angular displacement is the practical limit and in which case a decimal division of ten degrees requires but four ranges of master primary gage-blocks, as follows: A1 for 10° of angular displacement, A2 for 20° of angular displacement, A3 for 30° of angular displacement, and A4 for 40° of angular displacement. Additionally a master 15° A5 gage-block is employed, since that angle is widely used. A feature is the marking of these primary gage-blocks as "10", "15", "20", "30", and "40", these numerical designations being false readings with respect to and having no bearing upon the height of the gage-blocks in inches or the metric equivalent thereof. It will be apparent that the surface plane S suffices for the —O— degree range. With the sine-bar plug P1 on the surface S and plug P2 thereof on a selected one of the master primary gage-blocks A1–A5, direct placement of the sine-bar at a given angle is immediately attained, without calculations and without resort to trig tables and the tedious selection of and "wringing" together of inch or metric gage-blocks.

Combined with the surface plane S and with each master primary gage-block A1 through A4 (gage-block A5 is used alone), there is a range of smaller secondary gage-blocks B, each to displace the plug P2, and each of an additional height to increase the angle of displacement one degree greater than the preceding gage-block, as follows: B1 for one degree in excess of 0°, 10°, 20°, 30° and 40°; B2 for two degrees in excess of 0°, 10°, 20°, 30°, and 40°; and so on to B9 for nine degrees in excess of 0°, 10°, 20°, and 30°. Note that the 40°–45° range requires but five secondary gage-blocks B1 through B5. It is also to be noted that the same incremental increase in degrees of angularity is provided for in all secondary gage-blocks B1 through B9 as they are applied to the primary gage-blocks A1 through A4 (excluding A5). However, the inch or metric increase is entirely different in each range. With the sine-bar plug P1 on the surface plane S and plug P2 thereof on a selected pair of primary and secondary gage-blocks, direct placement of the sine-bar P at a given angle is immediately attained, without calculations and without resort to trig tables and the tedious selection of and "wringing" together of inch or metric gage-blocks.

A feature is the marking of these secondary gage-blocks as "0-1", "0-2" and so on through "0-9"; as "10-1", "10-2" and so on through "10-9"; as "20-1", "20-2" and so on through "20-9"; as "30-1", "30-2" and so on through "30-9"; and as "40-1", and so on through "40-5"; these numerical designations being false readings with respect to and having no bearing upon height of the gage-blocks in inches or the metric equivalent thereof. The following is a table of gage-block height measurements in inches which correspond to the aforementioned primary and secondary blocks A and B:

| Block Height Table | | | | |
|---|---|---|---|---|
| 1° | B1 = .08726 | 24° | B4 = .32358 |
| 2° | B2 = .17449 | 25° | B5 = .40299 |
| 3° | B3 = .26167 | 26° | B6 = .48175 |
| 4° | B4 = .34878 | 27° | B7 = .55985 |
| 5° | B5 = .43577 | 28° | B8 = .63725 |
| 6° | B6 = .52264 | 29° | B9 = .71394 |
| 7° | B7 = .60934 | 30° | A3 = 2.50000 |
| 8° | B8 = .69586 | 31° | B1 = .07519 |

-continued

Block Height Table

| | | | | | |
|---|---|---|---|---|---|
| 9° | B9 = .78218 | 32° | B2 = .14959 | | |
| 10° | A1 = .86824 | 33° | B3 = .22319 | | |
| 11° | B1 = .08580 | 34° | B4 = .29596 | | |
| 12° | B2 = .17131 | 35° | B5 = .36788 | | |
| 13° | B3 = .25651 | 36° | B6 = .43892 | | |
| 14° | B4 = .34136 | 37° | B7 = .50907 | | |
| 15° | B5 = .42585 | 38° | B8 = .57830 | | |
| 16° | B6 = .50994 | 39° | B9 = .64660 | | |
| 17° | B7 = .59361 | 40° | A4 = 3.21393 | | |
| 18° | B8 = .67684 | 41° | B1 = .06635 | | |
| 19° | B9 = .75959 | 42° | B2 = .13171 | | |
| 20° | A2 = 1.71010 | 43° | B3 = .19605 | | |
| 21° | B1 = .08174 | 44° | B4 = .25935 | | |
| 22° | B2 = .16293 | 45° | B5 = .32160 | | |
| 23° | B3 = .24355 | 15° | A5 = 1.29409. | | |

The micrometer M is shown in its basic form comprised of a pair of telescopically arranged elements, and including extensible elements, a barrel X and a thimble Y with a calibrated sleeve Z. The thimble sleeve is rotatable over the barrel, all of which are coaxially related so as to be employed in vertical alignment normal to the plane S" of sine-bar P'. Accordingly, the micrometer M is essentially an extensible right cylinder characterized by telescopically related barrel and thimble elements positioned by an extension screw 30. In accordance with this invention, the barrel X is a fixed extension of the sine-bar P' and the thimble Y carries an anvil in the form of a ball 31 extended by the screw to be supported by the surface S' of sine-bar P.

The barrel X is in the nature of a column depending from the elevating end of sine-bar P'. The upper end 20 is closed by plate pressed into the sine-bar body, and the outer cylinder wall 21 carries the index line later described, and is one inch diameter and internally threaded to receive the extension screw of the thimble Y. As shown, the periphery of the thimble Y is knurled for manual engagement.

The thimble Y is in the nature of a cup telescopically rotatable over the barrel with working clearance. The calibrated sleeve Z is rotatably adjustable on the thimble Y and held positioned thereto by one or more screw fasteners 32. The sleeve Z is tapered to an upper peripheral edge marked with minutes of indicia—calibrations, as later described.

Figure 3:
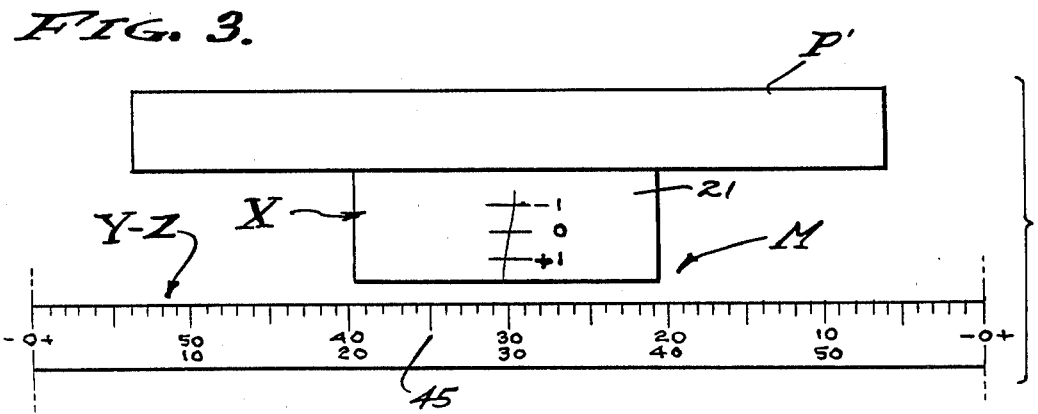
FIG. 3 is a diagramatic layout of the barrel and thimble calibrations for direct reading of the micrometer in plus or minus one degree, and in minutes of sine-bar angularity.

The extension screw 30 is a right cylinder adapted to threadedly engage into the barrel X. To this end, the exterior of the screw 30 is provided with a number of threads per inch that approximates one angular degree of rise or fall for one revolution thereof as related to length of the sine-bar involved. The increment of rotation is preferably one full turn, or a part turn thereof, for example a full turn for each degree of rise or fall as shown (see FIG. 3). The length of the sine-bar shown is five inches in each case, and in which case 11½ threads per inch is used and provides substantially one degree of sine-bar displacement from 0° to 1° plus or minus when rotating the thimble 360° one way or the other, but with increasingly excessive increment of extension as degrees of sine-bar displacement are added.

Referring now to the barrel X and the calibration of the index line 40, the thread lead of screw 30 approximates the ever decreasing increments corresponding to each successive degree of rise in relation to angular displacement of the sine-bar B. In practice, one turn of the thread helix of 11½ threads per inch will retract or extend the anvil ball 31 0.08695 inch, the height H' required for a full degree between 0° and 1° being 0.08725, in which case 0.0116 inch of circumferential travel subtracted or must be added to thimble rotation so as to provide exactly one degree of sine-bar displacement. However, the thread pitch constant of 0.08695 is a function of the continued arc through which the supporting anvil ball 31 passes; and for example, a degree of sine-bar displacement between 0° and 1° plus or minus requires 0.08726 inch retraction or extension of the anvil ball, in which case 0.0116 inch of circumferential travel is subtracted from and added to the thimble rotation so as to provide exactly one degree of sine-bar displacement. Thus, it will be understood, that thimble rotation increases and/or decreases from degree to degree of rise or fall, according to the trigonometric functions that establish angular displacement of the sine-bar. With this invention therefore, the index line 40 is displaced circumferentially 0.0116 in either direction according to the difference between the thread constant and elevation requirements with decreased increments of rise and fall as required for each degree of angular displacement added to the height H' for which the micrometer M is extended. Characteristically therefore, the index line 40 is curvilinear and an axially disposed line of increasing and/or decreasing lateral curvature commensurate with the difference between thread pitch and the elevation required to extend the anvil ball to correspond with the degree of displacement of the sine-bar P' to be positioned thereby. The index line 40 is displaced in the direction of rotation in each instance, plus and minus.

Referring now to the thimble Y and to the minutes of calibration 45, each full turn of the thimble relative to index line 40 retracts or extends the anvil ball one degree of sine-bar elevation, in which case 360° of the tapered sleeve Z is divided by axially disposed lines into sixty equal parts representing minutes of sine-bar displacement. Accordingly, the calibrations are marked "0" to "60" and these calibrations are then visibly related to the index line 40 for direct reading. A feature is the plus and minus operation of the direct reading micrometer M, having upper and lower scales progressing oppositely, clockwise for minus operation and counter-clockwise for plus operation. These calibrations are false readings with respect to and have on bearing upon height in inches or the metric equivalent thereof.

Referring now to measurement of height H in seconds of sine-bar displacement, a vernier scale can run parallel to the axially curved index line 40. The vernier scale is offset from the index line 40 in the direction of rotation and consists of twelve equally spaced lines occupying the circumferential distance of eleven equally spaced minute calibrations 45. Accordingly, each of the graduations 50 represents five seconds of angular displacement and are visibly related to the calibrations 45 for direct reading by observing marking value of the graduation that most closely coincides with a calibration 45.

From the foregoing it will be seen that the micrometer M is simple and durable in its construction, and adapted to be calibrated with accuracy. Height adjustment is made with facility by revolving the thimble sleeve Z, whereupon a direct reading in minutes within one degree is viewable. The anvil ball extension is corrected with facility, by resetting the rotatable position of the sleeve Z to the thimble Y as related to an exact position of the extension screw.

Having described only the typical preferred forms and applications of our invention, we do not wish to be limited or restricted to the specific details herein set forth, but wish to reserve to ourselves any modifications or variations that may appear to those skilled in the art as set forth within the limits of the following claims.

We claim:

1. In combination, a primary sine-bar having spaced parallel plugs and one plug supportably engaged upon a first surface plane and the other plug displaced from said surface plane in even degree increments by means of at least one gage-block in each instance and establishing a second surface plane of angularity, a secondary sine-bar having a plug parallel to the parallel plugs of the primary sine-bar and supportably engaged upon the second surface plane, and a micrometer spaced from the supportably engaged plug of the secondary sine-bar and comprising an anvil extended by a thimble threadedely engaged upon a barrel of uniform thread pitch depending from the secondary sine-bar for adjustably engaging the anvil with said second surface plane of the primary sine-bar, the thimble being calibrated in minutes of sine-bar angularity within one degree as related to an index line on the barrel.

2. The primary and secondary sine-bar and micrometer combination as set forth in claim 1, wherein one uniform thread pitch substantially equals a degree of angular sine-bar displacement, the circumference of the thimble being calibrated in 60 minute increments of sine-bar angularity as related to the index line on the barrel.

3. The primary and secondary sine-bar and micrometer combination as set forth in claim 1, wherein one uniform thread pitch substantially equals a degree of angular sine-bar displacement, the dircumference of the thimble being oppositely calibrated in 60 minute increments of sine-bar angularity for both clockwise and counterclockwise threading of the thimble above and below a "zero" degree mark on an index line extending longitudinally on the barrel.

4. The primary and secondary sine-bar and micrometer combination as set forth in any one of claims 1 through 3, wherein the index line is circumferentially displaced in the direction of thimble rotation as it extends longitudinally of the barrel thereby correcting the discrepancy in sine-bar angularity inherent in the thread of constant pitch.

5. The primary and secondary sine-bar and micrometer combination as set forth in any one of claims 1 through 3, wherein the index line is circumferentially recurved axially and displaced in the direction of thimble rotation as it extends longitudinally of the barrel thereby correcting the discrepancy in sine-bar angularity inherent in the thread of constant pitch.

6. In combination, a primary sine-bar having spaced parallel plugs and one plug supportably engaged upon a first surface plane and the other plug displaced from said surface plane in even degree increments by means of a set of at least one and not more than two gage-blocks in each instance and establishing a second surface plane, the primary gage-block being of a height thickness to establish the lowermost degree of elevation for a range of degrees for subsequent sine-bar angular displacement, and the secondary gage-block being of a height thickness to establish an additional degree of elevation within said range of degrees of sine-bar displacement, the primary and secondary gage-blocks being disposed one upon the other between the said surface plane and the said other plug displaced from said surface plane thereby, a secondary sine-bar having a plug parallel to the parallel plugs of the primary sine-bar and supportably engaged upon the second surface plane, and a micrometer spaced from the supportably engaged plug of the secondary sine-bar and comprising an anvil extended by a thimble threadedly engaged upon a barrel of uniform thread pitch depending from the secondary sine-bar for adjustably engaging the anvil with said second surface plane of the primary sine-bar, the thimble being calibrated in minutes of sine-bar angularity within one degree as related to an index line one the barrel.

7. The primary and secondary sine-bar and micrometer combination with direct angular displacement primary and secondary gage-blocks as set forth in claim 6, wherein the range of degrees is divisible into a multiplicity of like groups and wherein the secondary gage-blocks are of a like number of increasing degrees within each group, and each gage-block of a height thickness related to sine-bar angular displacement as predetermined by the trigonometric function of its elevation from the surface plane.

8. The primary and secondary sine-bar and micrometer combination with direct angular displacement primary and secondary gage-blocks as set forth in claim 6, wherein the range of degrees is divisible into tens in like groups and wherein the secondary gage-blocks are of a like number of increasing degrees within each group, and each gage-block of a heigth thickness related to sine-bar angular displacement as predetermined by the trigonometric function of its elevation from the surface plane.

9. The primary and secondary sine-bar and mircometer combination with direct angular displacement primary and secondary gage-blocks as set forth in claim 6, wherein the primary gage-blocks are of a height thickness establishing the lowermost degree for ranges of angular sine-bar displacement divisible in tens of degrees, and wherein the secondary gage-blocks are of a height thickness establishing the incremental increase in degrees as predetermined by the trigonometric function of each gage-block elevation from the surface plane.

10. The primary and secondary sine-bar and micrometer combination with direct angular dispacement primary and secondary gage-blocks as set forth in claim 6, wherein the primary gage-blocks are of a height thickness establishing the lowermost degree for ranges of angular sine-bar displacement divisible in tens of degrees, and wherein the secondary gage-blocks are of a height thickness establishing at least one incremental increase in degrees as predetermined by the trigonometric function of each gage-block elevation from the surface plane.

11. The primary and secondary sine-bar and micrometer combination with direct angular displacement primary and secondary gage-blocks as set forth in claim 6, wherein the primary gage-blocks are of a height thickness establishing the lowermost degree for ranges of angular sine-bar dispacement divisible in tens of degrees, and wherein the secondary gage-blocks are of a height thickness establishing nine incremental increases in degrees as predetermined by the trigonometric function of each gage-block elevation from the surface plane.

12. The primary and secondary sine-bar and micrometer combination with direct angular displacement primary and secondary gage-blocks as set forth in claim 6, wherein the primary gage-blocks are of a height thickness establishing the lowermost degree for ranges of angular sine-bar displacement of ten to twenty degrees and of twenty to thirty degrees and of thirty to forty degrees, and wherein the secondary gage-blocks are of a height thickness establishing the incremental increase in degrees as predetermined by the trigonometric function of each gage-block elevation from the surface plane.

13. The primary and secondary sine-bar and micrometer combination with direct angular displacement primary and secondary gage-blocks as set forth in claim 9, wherein the secondary gage-blocks are of height thicknesses establishing incremental increases in degrees as predetermined by the trignometric function of each gage-block elevation from the surface plane.

* * * * *